United States Patent
Narula et al.

(10) Patent No.: US 11,737,023 B2
(45) Date of Patent: Aug. 22, 2023

(54) INFORMATION HANDLING SYSTEM AND PERIPHERAL WIRELESS PAIRING BY DEVICE POSITIONING AND ADAPTIVE POWER CONTROL

(71) Applicant: Dell Products L.P., Round Rock, TX (US)

(72) Inventors: Harpreet S. Narula, Austin, TX (US); Kameel Ashok Vohra, Singapore (SG); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 17/479,362

(22) Filed: Sep. 20, 2021

(65) Prior Publication Data

US 2023/0086381 A1   Mar. 23, 2023

(51) Int. Cl.
| | |
|---|---|
| *H04W 76/10* | (2018.01) |
| *H04W 52/00* | (2009.01) |
| *H04W 52/02* | (2009.01) |
| *H04W 76/14* | (2018.01) |
| *H04W 4/02* | (2018.01) |

(52) U.S. Cl.
CPC ....... *H04W 52/0229* (2013.01); *H04W 4/023* (2013.01); *H04W 52/0203* (2013.01); *H04W 52/0241* (2013.01); *H04W 76/14* (2018.02)

(58) Field of Classification Search
CPC ............. H04W 52/0229; H04W 4/023; H04W 52/0203; H04W 52/0241; H04W 76/14; H04W 40/38; H04W 76/10; H04B 3/544; H04B 7/18558
See application file for complete search history.

(56) References Cited

U.S. PATENT DOCUMENTS

| | | | |
|---|---|---|---|
| 11,089,438 B2 | 8/2021 | de la Broise et al. | |
| 11,501,530 B1* | 11/2022 | Silverstein | ............. G06V 40/18 |
| 11,550,023 B2* | 1/2023 | Grabbe | ................... G01S 5/021 |

(Continued)

OTHER PUBLICATIONS

Apple, "Set up AirPods with your Mac and other Bluetooth devices," downloaded from https://support.apple.com/en-us/HT208718#:~:text=Make%20sure%20that%20Bluetooth%20is,Devices%20list%2C%20then%20click%20Connect on Sep. 17, 2021, 3 pages.

(Continued)

*Primary Examiner* — Andrew Wendell
(74) *Attorney, Agent, or Firm* — Zagorin Cave LLP; Robert W. Holland

(57) ABSTRACT

An information handling system manages automated wireless pairing with phase-based ranging to automatically initiate pairing when the peripheral powers up in an advertising mode within a predetermined range of the information handling system. In one embodiment, a display user interface presents instructions to the end user to move the peripheral to a different distance relative to the information handling system to confirm the pairing. In another embodiment, radio power for the pairing is adjusted based upon the distance to provide communication at substantially the pairing range as further confirmation of pairing to the correct peripheral and additional security for the pairing key exchange.

18 Claims, 6 Drawing Sheets

(56) References Cited

U.S. PATENT DOCUMENTS

| | | | |
|---|---|---|---|
| 2014/0378056 A1* | 12/2014 | Liu | H04W 52/0245 |
| | | | 455/41.2 |
| 2017/0208430 A1* | 7/2017 | Tsuchida | H04W 4/80 |
| 2017/0220490 A1* | 8/2017 | Tan | G06F 1/1662 |
| 2017/0301078 A1* | 10/2017 | Forutanpour | G06T 7/0004 |
| 2017/0353928 A1* | 12/2017 | Kim | H04W 52/0229 |
| 2019/0020097 A1* | 1/2019 | Chang | H01Q 1/243 |
| 2020/0137712 A1* | 4/2020 | Yu | G01S 13/765 |
| 2021/0168710 A1 | 6/2021 | Desai et al. | |
| 2021/0321223 A1* | 10/2021 | Adachi | H04W 12/069 |
| 2022/0053578 A1* | 2/2022 | Schodet | H04W 76/10 |

OTHER PUBLICATIONS

Microsoft, "Swift Pair," downloaded from https://docs.microsoft.com/en-us/windows-hardware/design/component-guidelines/bluetooth-swift-pair on Sep. 17, 2021, 8 pages.

* cited by examiner

INFORMATION HANDLING SYSTEM AND PERIPHERAL WIRELESS PAIRING BY DEVICE POSITIONING AND ADAPTIVE POWER CONTROL

BACKGROUND OF THE INVENTION

Field of the Invention

The present invention relates in general to the field of information handling systems and wireless peripherals, and more particularly to an information handling system and peripheral wireless pairing by device positioning and adaptive power control.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components in a housing to support information processing based upon inputs made through input devices, such as keyboard and mouse, and present the information at output devices, such as display or audio speaker. Conventionally, input/output (I/O) devices interface with an information handling system through cables, such as a USB cable. More recently, many information handling systems have incorporated wireless network interface cards (WNIC) that support wireless communication with networks and peripherals, such as wireless local area networks (WLAN) that comply with 802.11 (b, g, n) and wireless personal area networks that comply with BLUETOOTH and similar standards. Wireless peripheral devices, such as wireless mouse, keyboard, speaker and similar devices, offer convenience by limiting the number of cables at an information handling system work area. One disadvantage of wireless peripheral devices is that the end user typically has to pair an information handling system with a wireless peripheral with a multi-step user process. Further, in an enterprise location a large number of wireless peripherals may often be found, which can make pairing with a desired peripheral confusing where a large number of wireless peripheral devices advertise as available.

Generally, current WPAN pairing connections, such as for BLUETOOTH devices, require end users to confirm connections with manual interventions. The manual interactions tend to create a slow and complicated pairing process. Further, for a fixed computing environment having a desktop configuration without integrated input devices, an end user generally has to have a wired connection in order to set up a wireless peripheral. For instance, the end user cannot make a selection at a pairing user interface to interact with a wireless mouse or keyboard unless the user already has a wired peripheral. Conventional BLUETOOTH pairing and bonding involves the peripheral device emitting an advertising broadcast, which is typically detected by multiple information handling systems within range of the peripheral. Further, when the end user looks at pairing user interface to establish a wireless interface, multiple wireless peripherals may be seen leading to confusion as to the desired peripheral device for the interface. Some peripheral devices attempt to shorten these steps, such as the Microsoft Swift Pair protocol, however in dense wireless environments this can result in pairing to an incorrect computing device and can expose security vulnerabilities where an attacker sniffs pairing packets, which can allow tracking of keystrokes or other inputs. One technique to avoid this security vulnerability is to present a secret code at an information handling system that the end user has to input to complete pairing. These additional steps cause delay in pairing, complicate the pairing process and often lead to frustration.

SUMMARY OF THE INVENTION

Therefore, a need has arisen for a system and method which supports peripheral wireless pairing by device positioning and adaptive power control.

In accordance with the present invention, a system and method are provided which substantially reduce the disadvantages and problems associated with previous methods and systems for pairing an information handling system and peripheral. Distance measured between a peripheral and information handling system are applied to have an automated pairing without end user inputs to the information handling system, such as inputs at a user interface. A phase-based ranging provides confirmation of pairing based upon a distance between the information handling system and wireless peripheral and also secures the pairing information exchange through management of the radio power settings.

More specifically, an information handling system processes information with processing components disposed in a housing, such as a central processing unit executes instructions to process information and a random access memory that stores the instructions and memory. A wireless networking interface card (WNIC) having a radio interfaces the information handling system with peripheral devices having a WNIC and radio using a wireless personal area network (WPAN) protocol such as BLUETOOTH. For instance, an unbonded peripheral powers up to an advertising state that is detected by an information handling system. The information handling system establishes a pairing communication that initiates HADM transponder tones to determine a distance between the information handling system and peripheral. If the distance is within a pairing range, the information handling system presents to the end user instructions for the placement of the peripheral at a location having a distance that confirms the peripheral for pairing. Upon confirmation, the information handling system and peripheral reduce radio power to a pairing range setting so that pairing is performed with enhanced security and reduced risk of an attack by sniffing of pairing wireless communications.

The present invention provides a number of important technical advantages. One example of an important technical advantage is that an information handling system pairs with a wireless peripheral in an automated manner based upon a determination of a distance between the information handling system and peripheral by a phased-based ranging protocol, such as the high accuracy distance measurement (HADM) protocol available from BLUETOOTH. Pairing and secure long term bonding is provided without any end user inputs to the information handling system, such as at a user interface. Correct peripheral selection is provided by both phase-based ranging and a radio power setting appropriate for the detected range. The automated pairing reduces confusion in the selection and interactions with peripheral devices in crowded wireless environments to provide an end user with a secure, simple and favorable end use experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system coordinates automated pairing with peripheral devices by reference to a phase-based radio range. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
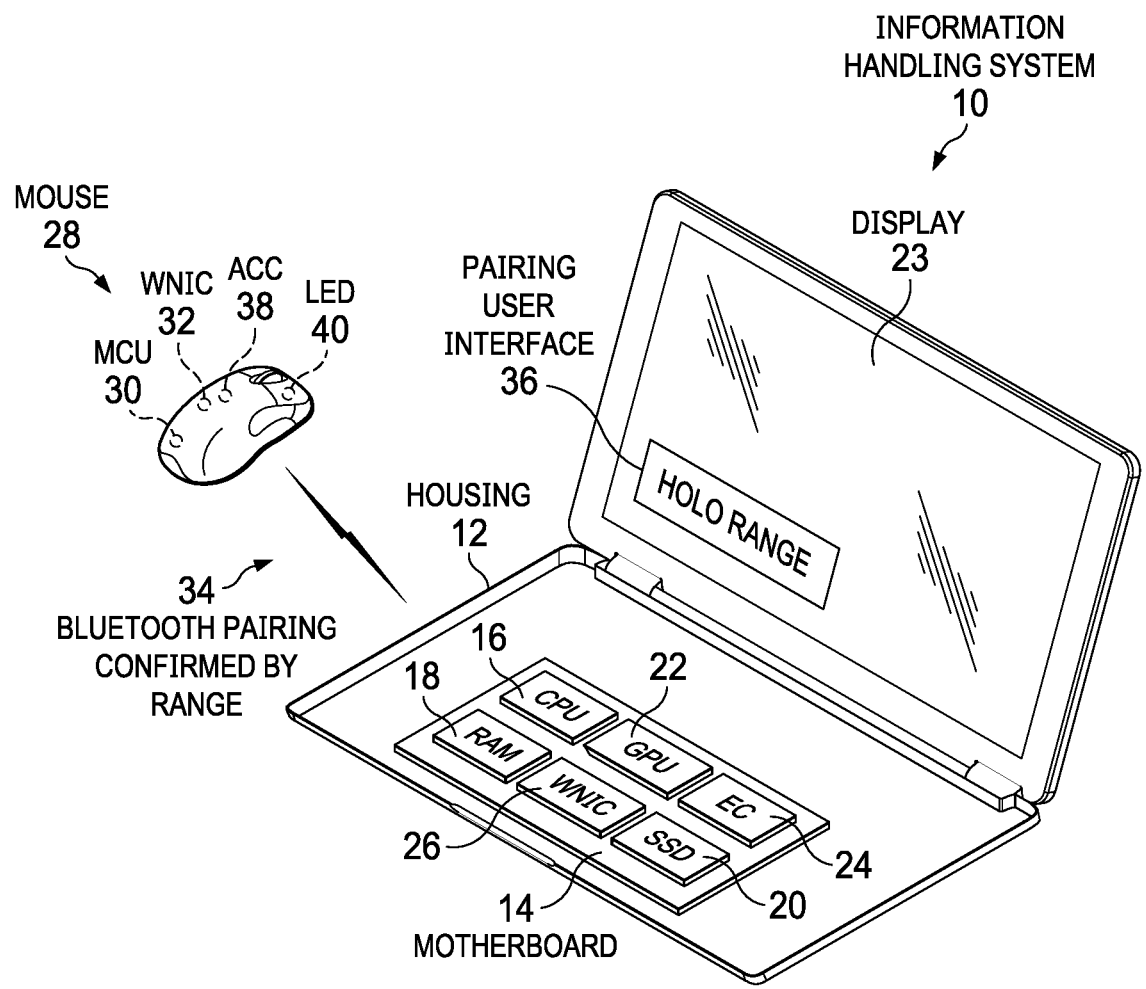
FIG. 1 depicts a block diagram of an information handling system configured to pair with a peripheral confirmed by a phase-based range determination.

Referring now to FIG. 1, a block diagram depicts an information handling system 10 configured to pair with a mouse peripheral 28 confirmed by a phase-based range determination 34. In the example embodiment, information handling system 10 has a portable configuration built into a portable housing 12 and peripheral 28 is a mouse. In alternative embodiments, information handling system 10 may have a stationary configuration, such as a desktop or tower housing, and may interact with a variety of different types of peripherals, such as a keyboard, a speaker, a microphone or any of a variety of devices that interact with information handling systems through wireless personal area networks (WPANs) like BLUETOOTH. In the example embodiment, information handling system 10 processes information with processing components disposed in portable housing 12 that communicate through a motherboard 14. For instance, a central processing unit (CPU) 16 executes instructions that process information with the instructions and information stored in a random access memory (RAM) 18. A solid state drive (SSD) 20 or other non-transitory memory, such as flash memory, stores information and instructions in persistent memory during power down periods. As an example, an operating system and applications stored in SSD 20 are retrieved to RAM 18 for execution by CPU 16 at system power up. A graphics processing unit (GPU) 22 further processes the information to define visual images for presentation at a display 23, such as by defining pixel values. An embedded controller 24 interfaces with CPU 16 to provide management of operating conditions within housing 12 and interactions with peripheral devices, such as an integrated keyboard or other Input/Output devices. A wireless network interface card (WNIC) 26 includes a radio that supports wireless communication with external devices, such as a WNIC 32 included in mouse peripheral 28. In the example embodiment described in greater depth below, WNIC 26 and 32 support communication through a BLUETOOTH wireless personal area network (WPAN) protocol; however, in alternative embodiments, other types of wireless networks may be used, such as various WiFi protocols.

In the example embodiment, peripheral 28 is a mouse that interfaces with information handling system 10 through BLUETOOTH LOW ENERGY (BLE) wireless communication. Mouse peripheral 28 has a microcontroller unit (MCU) 30 that integrates a processing resource that executes instructions and a non-transitory memory that stores the instructions. As an example, MCU 30 and WNIC 32 are built into a system on chip (SOC) that supports BLE communications. An accelerometer 38 interfaces with MCU 30 to detect movement of mouse peripheral 28 and report the movement through BLE packets to information handling system 10. A light emitting diode (LED) 40 provides a visual indication of operations at peripheral 28, such as indication that peripheral 28 is powered up, advertising, paired or performing other operations. Generally, mouse peripheral 28 supports typical BLE operations that include manual selection of pairing operations and unpairing operations through a pairing user interfaces 36 presented at the information handling system display. In a typical BLE peripheral, pairing results in the exchange of a security key that supports long term bonding of the devices so that, once bonded, the peripheral and information handling system will automatically pair when turned on. For instance, at power up of mouse peripheral 28, an advertising protocol is initiated so that a bonded information handling system can respond to the advertising and automatically pair for use. If no bonded information handling system receives the advertising, the advertising continues until pairing is established or the peripheral times out and powers down.

The present disclosure provides a system and method that supports automated pairing of a peripheral to an information handling system when a bond does not exist. Peripheral 28 powers up to an advertising state, such as in a conventional manner at a nominal radio power setting, usually full power. Upon detecting the peripheral advertising, information handling system 10 analyzes the advertising wireless signals to determine a BLUETOOTH pairing confirmed by range 34 between the information handling system and peripheral and, if the range is within a predetermined distance, such as less than a meter, automatically initiates pairing and bonding with the peripheral. More specifically, range is determined with High Accuracy Distance Measurement (HADM) provided by the BLUETOOTH standard and offering centimeter or better distance accuracy measurements. In one example embodiment, when an advertising peripheral 28 is detected by information handling system 10, a pairing user interface 36 is presented at the display that provides instructions for the end user to hold the peripheral in place at the first distance or to move the peripheral to a second distance as confirmation of the pairing before the pairing is completed. For instance, pairing user interface 36 may present a visual image that shows a position location relative to housing 12 at which a HADM determined distance confirms the end user's desire to pair the information handling system and peripheral. If the peripheral moves to a different distance or moves after direction to remain still, the pairing is aborted. As a result, the end user can complete pairing to a peripheral without any inputs made to the information handling system, such as menu selections, button pushes or clicks at user interfaces; rather the end user turns on the peripheral and places the peripheral still within a predetermined range of the information handling system to complete the pairing.

Figure 2:
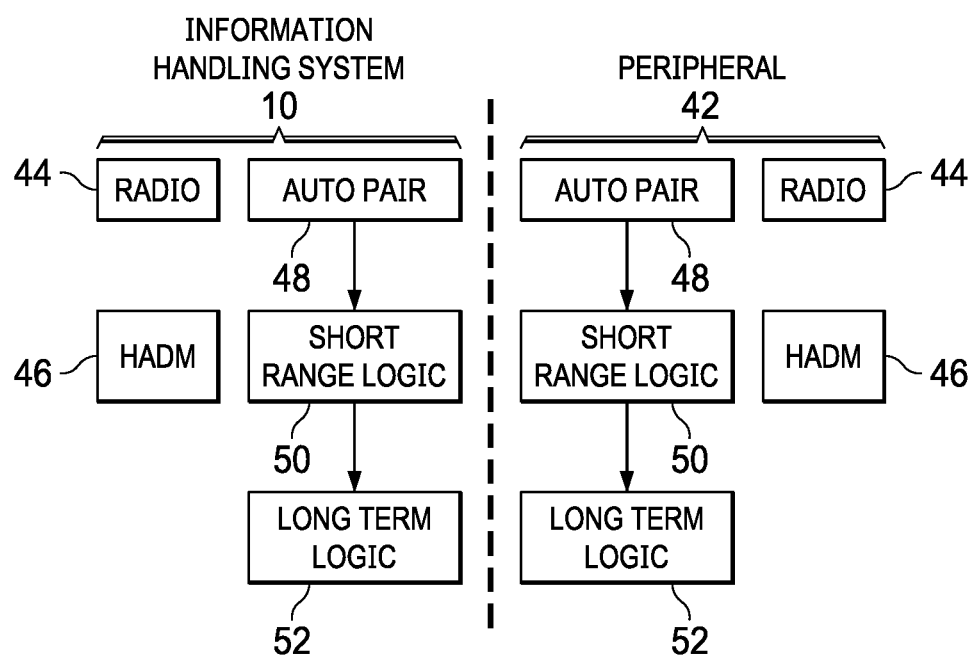
FIG. 2 depicts a block diagram of a wireless personal area network having phase-based range automated pairing.

Referring now to FIG. 2, block diagram depicts a wireless personal area network (WPAN) having phase-based range automated pairing. Both information handling system 10 and peripheral 42 have a radio 44 that operates in a frequency range used by the WPAN, such as the 2.4 GHz band used by BLUETOOTH. Both information handling system 10 and peripheral 42 include a HADM module 46 that manages wireless signal transmission and reception to determine a distance between the radios 44. The BLUETOOTH HADM protocol is performed using phased-based ranging and may be performed with a single frequency during high duty cycle advertising to an accuracy of around 5 cm in a measurement time of approximately 25 ms. HADM is a phased-based ranging technique that sets up a range transponder having a set of tones, such as 75, exchanged between the information handling system and peripheral by reference to the phase of the exchanged wireless signals.

At power up of peripheral 42, its radio 44 sends a BLE advertising beacon at a nominal power setting, typically full power, in a conventional manner, and information handling system 10 responds to the advertising beacon with HADM tones to identify itself as HADM enabled. Peripheral 42 HADM module 46 detects the HADM transponder tones of information handling system 10 to enable an auto pair module 48 and communicate auto pair capability to information handling system 10. In one example embodiment, a transition is performed by peripheral 42 to a high duty cycle advertising mode to enable fast discovery and pairing as well as rapid ranging with a single frequency application of the HADM protocol. Once both peripheral 42 and information handling system 10 have identified HADM capability and enabled distance measurement, auto pair modules 48 may coordinate an automated pairing without further involvement of the end user provided that the distance falls within a predetermined pairing range, such as less than a meter; however, additional movement of the peripheral to a from an initial distance to second distance may be used as a confirmation of the automated pairing. Similarly, a movement away from an initial distance may be used to indicate an abort of the automated pairing. Auto pair module 48 presents at the information handling system display visual indications of the auto pairing process, such as a message to leave the peripheral still to confirm pairing, a message to move the peripheral to an indicated position or distance to confirm pairing, and/or message to move the peripheral out of the pairing range to abort the pairing. In one example embodiment, the accelerometer may be used to help detect peripheral motion.

One auto pair module 48 determines that automated pairing should proceed, it applies a pairing range radio power setting for transmission of radio signals from information handling system 10 and peripheral 42. Pairing range radio power settings transmit wireless signals with a strength sufficient to support reliable reception at the distance between the peripheral and information handling system but insufficient to support reliable reception outside of the distance. For example, expected error rate for radio transmissions may be used to select the power setting for the pairing range. In one example embodiment, the reduced radio signal strength is based upon expected signal strength for the predetermined pairing range distance rather than on the received signal strength indication at each radio 44. Using the expected radio power setting for the distance helps to ensure that only a desired peripheral device within range successfully pairs and that external devices cannot sniff the pairing process so that pairing is more secure. If the auto pair process fails due to insufficient radio signal strength, a user interface presentation may be provided to support manual pairing of the peripheral in a conventional manner. In one embodiment, peripheral 42 may go to the lower pairing range radio power setting after successful distance transponder transmission, in response to an indication from the information handling system, such as a lower power radio signal, or in response to movement detected by an accelerometer after distance transponder transmission takes place. In one embodiment, an LED indication on the peripheral device indicates to an end user to leave the peripheral still until auto pairing is complete. Information handling system 10 continues distance determinations until the distance is indicated at which auto pairing is confirmed and, in one embodiment, at transition of the peripheral to the pairing range power setting. Various time-outs may be used during the selection of peripheral position and distance so that auto pairing will abort in the event of an excessive time period to allow a manual pair to take place.

Once auto pairing is confirmed, a short range logic 50 executes to exchange a short term key between the peripheral and information handling system so that the exchange of bonding information is encrypted. After short range logic establishes a secure interface, long term logic 52 exchanges long term keys that are used for bonding and for subsequent interfaces between the bonded information handling system and peripheral. Advantageously, pairing completes to bond the information handling system and peripheral without end user actions, such as inputting a passcode. In one embodiment, the short range logic may include a pre-programmed key that a manufacturer uses at initial power up of an unpaired peripheral. Once bonding is complete, a notification is provided to the end user at the information handling system display and the radio power is returned to a nominal power setting, meaning the power setting used for normal interactions as opposed to the pairing range power setting. Using the pairing range radio power setting through the full bonding process helps to maintain a secure pairing by reducing the risk of packet sniffing by other information handling systems or wireless devices. In one alternative embodiment, the pairing range power setting is only used to exchange the short term key and nominal power settings are used for the remainder of the pairing process, including the exchange of the longer term keys encrypted with the short term keys. For instance, once short range logic 50 establishes a secure interface with short term keys, radio 44 returns to nominal power to perform long term logic 52 that exchanges the long term keys associated with bonding. In various embodiments, the HADM, auto pair, short range logic module and long term logic module are instructions stored in non-transitory memory, such as an SSD, and distributed to processing resources for execution, such as by an operating system having drivers that execute on a CPU, embedded controller and/or MCU.

Figure 3:
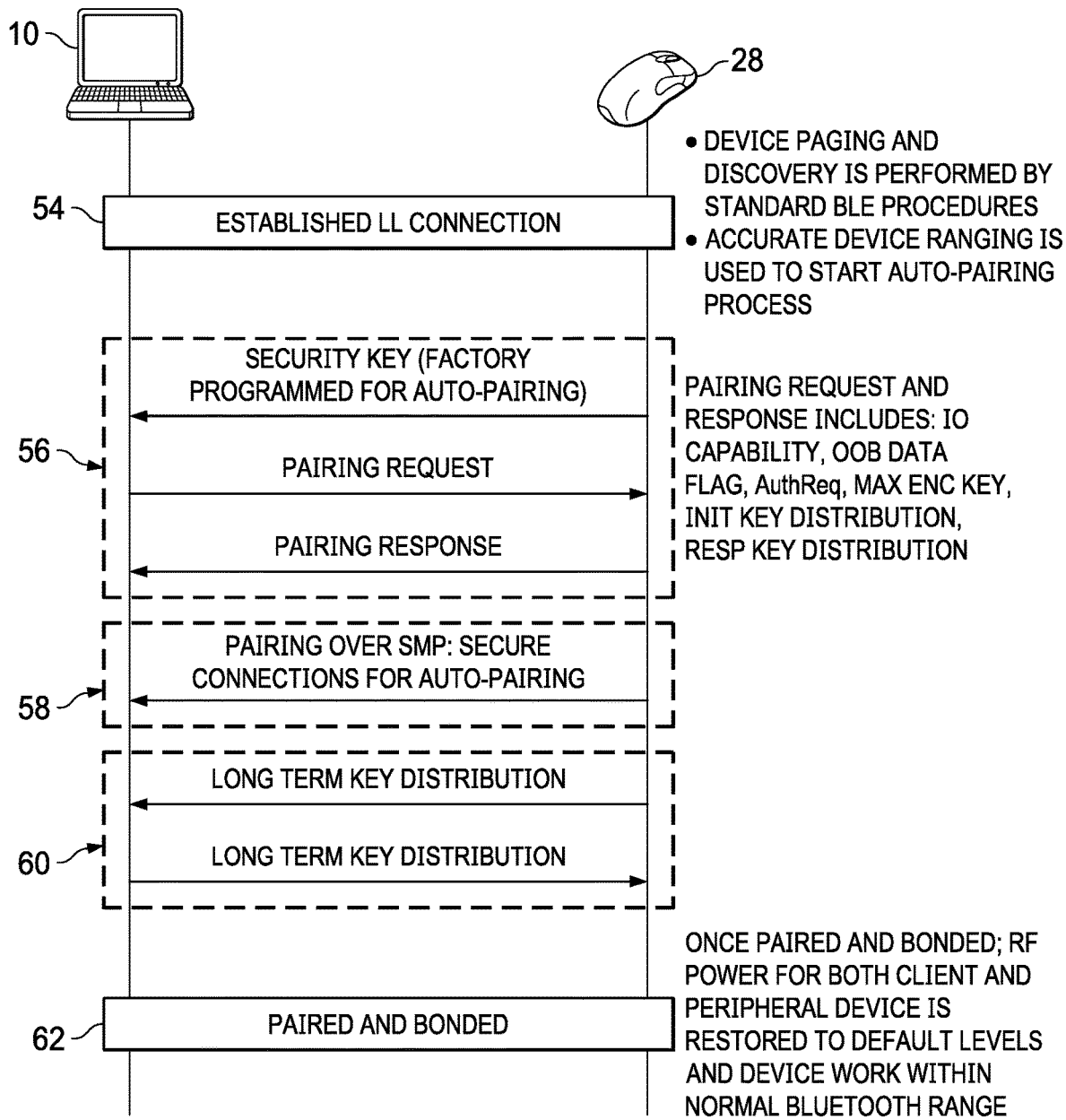
FIG. 3 depicts a flow diagram of process for automated pairing with a product-specific pairing key.

Referring now to FIG. 3, a flow diagram depicts a process for automated pairing with a product-specific pairing key. For example, the process of FIG. 3 is performed at step 54 once phase-based range initiates an auto pairing of the mouse peripheral 28 and information handling system 10. At step 56 a pairing security key factory programmed to indicate auto pairing capability is sent from the peripheral to the information handling system and a pairing request is responded to with a pairing response using the pairing range radio power setting. For instance, the pairing request and responses include IO capability, OOB data flag, an AuthReq, a Max Enc Key, an Init Key distribution and a Resp key distribution. At step 58 pairing is established over SMP with a short term security key from the factory programming to provide a secure connection for auto pairing. At step 60, the long term key distribution is provided between the peripheral and information handling system to complete bonding at step 62. In the example embodiment, both the factory programmed short term secure interface and the long term bonding are performed at the pairing range power setting, although in an alternative embodiment the long term key distribution may be performed at nominal power.

Figure 4A:
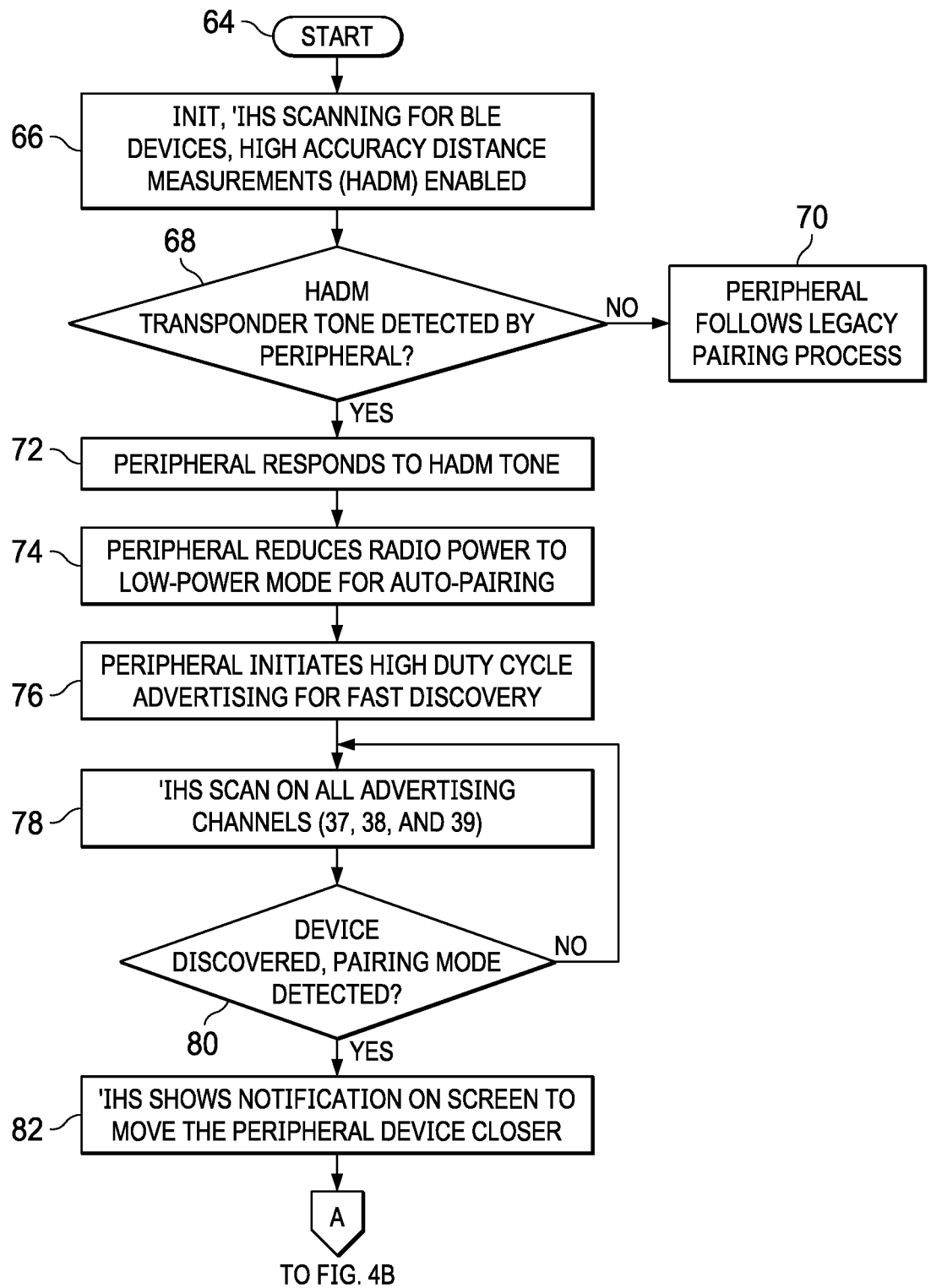
FIGS. 4A, 4B and 4C depict a flow diagram of a process for a peripheral device automated pairing with phase-based range confirmation.
Figure 4B:
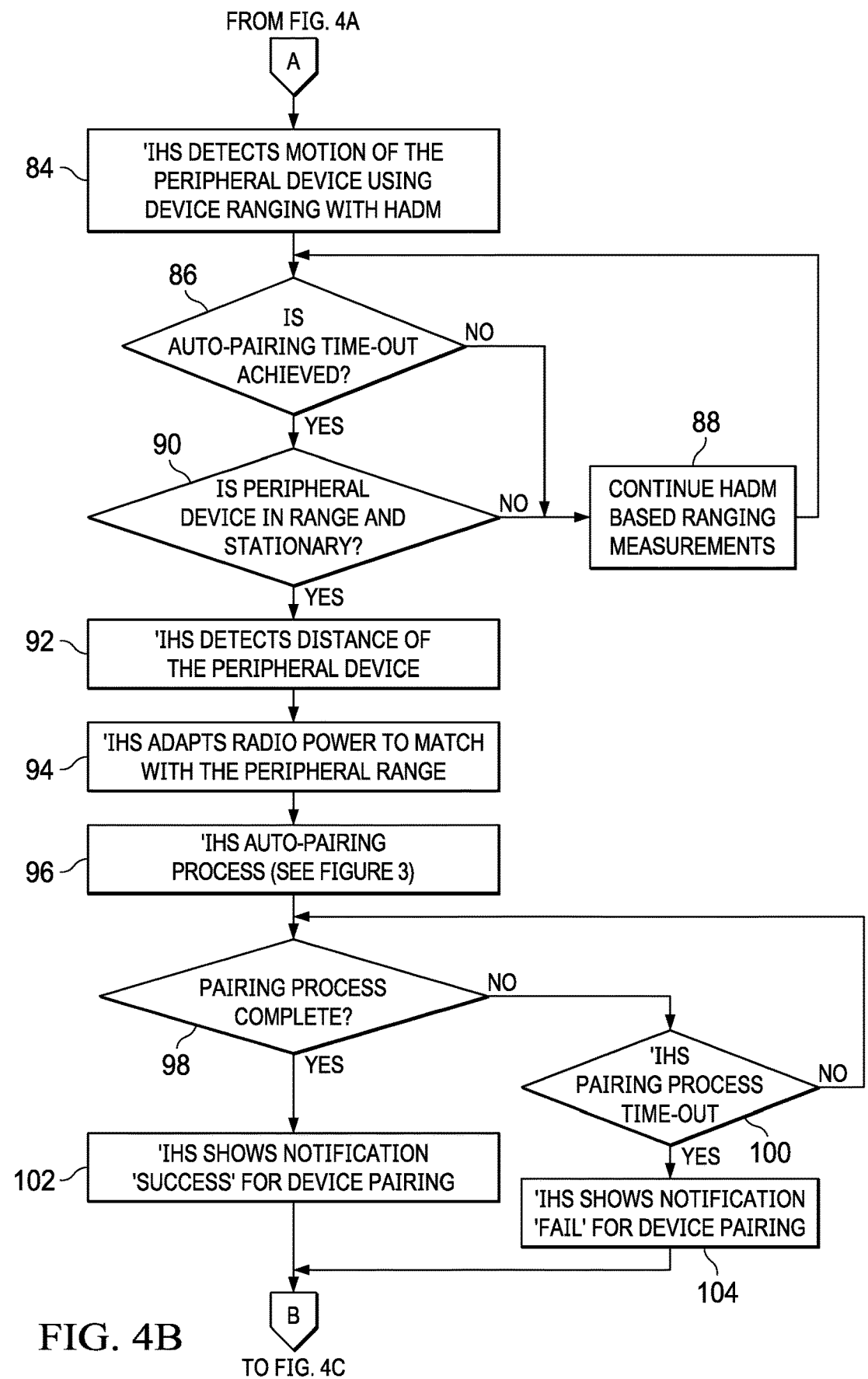
Figure 4C:
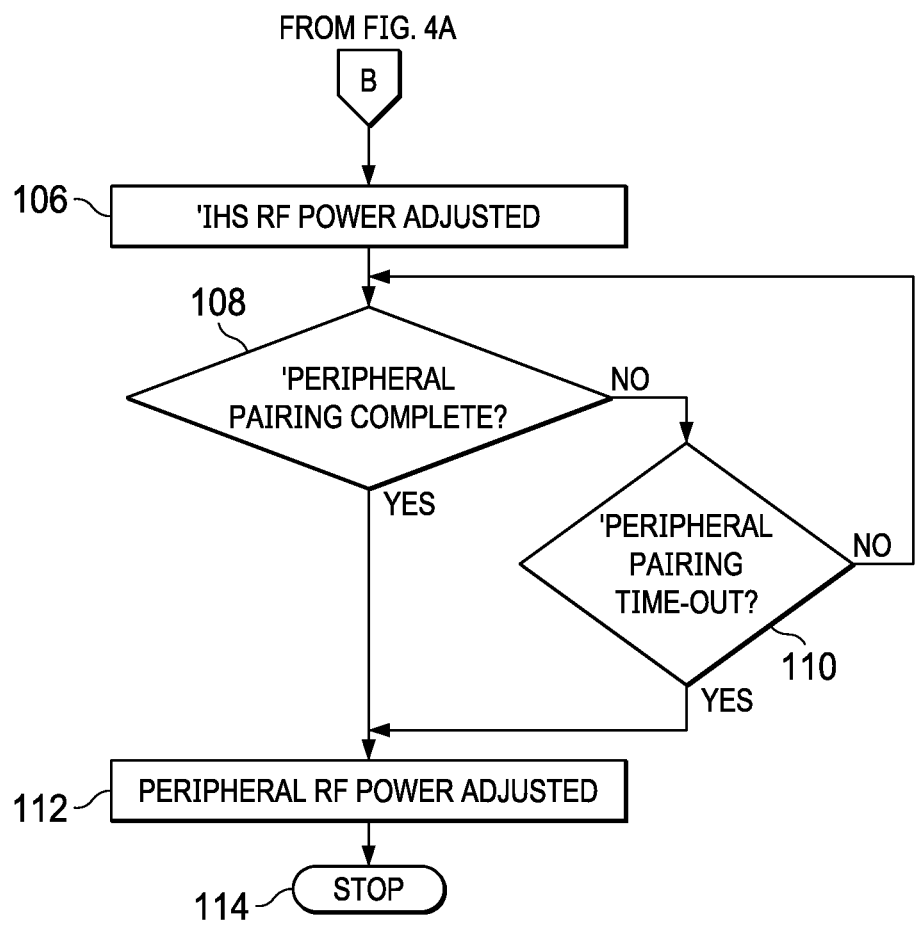

Referring now to FIGS. 4A, 4B and 4C, a flow diagram depicts a process for a peripheral device automated pairing with phase-based range confirmation. The process starts at step 64 and continues to step 66 at which the information handling system scans for BLE devices and has HADM distance measurement enabled. At step 68 a determination is made of whether a HADM transponder tone is detected by the peripheral device and, if not, the process terminates at step 70 by performing legacy pairing processes. If the peripheral detects an HADM transponder tone at step 68 the process continues to step 72 where the peripheral responds with HADM tone. At step 74 the peripheral reduces radio transmit power to a low power mode for auto pairing, such as the pairing range power setting if the distance to the information handling system is within the predetermined auto pairing range. At step 76 the peripheral initiates a high duty cycle advertising for fast discovery by the information handling system and more rapid distance determination. At step 78, the information handling system scans on all advertising channels (such as channels 37, 38 and 39) to determine at step 80 if a peripheral is detected in the pairing mode. Once the peripheral is detected, the process continues to step 82 for the information handling system to show a notification on the display to move the peripheral device from the first location to a second and closer location as a confirmation for auto pairing.

Referring now to FIG. 4B the process continues at step 84 with confirmation of pairing by detection of the peripheral device moving with the phased-based ranging provided by HADM. At step 86 a time out is compared to determine whether to continue pairing while the peripheral moves to the new location. As long as time remains at step 86 the process continues to step 88 for the HADM ranging measurements to detect confirmation of auto pairing. At step 90 a determination is made of whether the peripheral device has the confirmation distance to the information handling system and is stationary. If not, the process returns to step 86 to continue monitoring for confirmation until a final time out. At step 90, once a confirmation distance between the peripheral and information handling system is detected, the process continues to step 92 to confirm the distance and step 94 to confirm that the peripheral radio power, such as measure with RSSI, matches with the peripheral distance. Once confirmation is achieved, the process continues to step 96 to perform auto pairing, such as is depicted by FIG. 3. At step 98 the pairing process is monitored for completion and, if not complete is monitored at step 100 for a process time out to use as an abort. Once pairing is complete at step 98, the process continues to step 102 to show a notification of a pairing success. If pairing time out occurs at step 104, the information handling system presents a notification of a pairing failure. The process then continues to step 106 to return the information handling system radio power settings to the nominal power settings.

Referring now to FIG. 4C, a determination is made at step 108 if the peripheral pairing is complete and, if not, a determination is made at step 110 if a peripheral pairing time out is detected. Once peripheral pairing is complete or a timeout has occurred, the process continues to step 112 to return the peripheral radio power setting to its nominal value and the process completes at step 114.

Although the present invention has been described in detail, it should be understood that various changes, substitutions and alterations can be made hereto without departing from the spirit and scope of the invention as defined by the appended claims.

What is claimed is:

1. An information handling system comprising:
 a portable housing;
 a processor disposed in the portable housing and operable to execute instructions that process information;
 a memory disposed in the housing and interfaced with the processor, the memory operable to store the instructions and information;
 a display coupled to the housing and interfaced with the processor, the display operable to present the information as visual images;
 a radio interfaced with the processor and operable to communicate the information through wireless signals, the radio having a distance measurement transponder;
 an auto pairing module interfaced with the radio and operable to determine a distance to a peripheral having a peripheral radio advertising to pair, and operable to automatically pair with the peripheral radio when a predetermined distance is determined; and
 a pairing user interface presented at the display to direct movement of the peripheral from a first distance to a second distance as confirmation of pairing.

2. The information handling system of claim 1 further comprising:
 a peripheral having a peripheral radio; and a peripheral auto pairing module interfaced with the peripheral radio and operable to interface with the auto paring module through wireless signals to coordinate pairing at the predetermined distance.

3. The information handling system of claim 2 wherein the predetermined distance is the second distance and only initiates auto pairing with the movement.

4. The information handling system of claim 1 wherein the distance measurement transponder comprises a high accuracy distance measurement transponder sending tones as part of the peripheral radio advertising to pair.

5. The information handling system of claim 1 wherein the auto pairing module is further operable to, in response to the predetermined distance, set the radio transmit power from a nominal power to a pairing power having a pairing range of substantially the predetermined distance.

6. The information handling system of claim 5 wherein the auto pairing module is further operable to exchange a short term key at the pairing and apply the short term key to exchange a long term key for bonding.

7. The information handling system of claim 6 wherein the exchange of the short term key is performed at the pairing power and the exchange of the long term key is performed at the nominal power.

8. The information handling system of claim 7 wherein auto pairing module maintains the pairing power until bonding is complete and then resumes the nominal power.

9. A method for wireless pairing of an information handling system and a peripheral, the method comprising:
detecting at the information handling system advertising by the peripheral at a first transmit power;
in response to the detecting, determining with the information handling system a first distance to the peripheral with phased-based radio ranging;
presenting at a display of the information handling system that movement of the peripheral to a second distance from the information handling system will initiate pairing;
detecting the peripheral at the second distance; and
in response to the detecting the peripheral at the second distance, automatically initiating pairing at a second transmit power associated with the second distance.

10. The method of claim 9 further comprising:
advertising from the peripheral at power up of the peripheral when the peripheral is not bonded, the advertising at a nominal power; and
reducing peripheral and information handling system radio power to a pairing range of substantially the first distance in response to the automatically initiating pairing.

11. The method of claim 10 further comprising:
performing bonding with the radio power at the pairing range;
aborting the bonding when the radio power at the pairing range is insufficient; and
in response to completion of bonding, returning the radio power to a nominal power.

12. The method of claim 10 further comprising:
in response to initiating pairing, exchanging a short term key between the information handling system and peripheral; and
exchanging a long term key between the information handling system and peripheral secured by the short term key.

13. The method of claim 12 further comprising exchanging both the short term key and the long term key at the pairing range radio power to complete bonding of the peripheral and the information handling system and then setting the nominal power.

14. The method of claim 12 further comprising:
exchanging the short term key at the pairing range radio power; and
exchanging the long term key at the nominal radio power.

15. The method of claim 9 further comprising:
detecting with the phase-based radio ranging a predetermined change of the distance between the information handling system and peripheral from the second distance; and
in response to the detecting the predetermined change of the distance, aborting the pairing.

16. A method for wireless pairing of an information handling system, the method comprising:
detecting at the information handling system advertising by the peripheral;
in response to the detecting, determining with the information handling system a first distance to the peripheral with phase-based radio ranging;
when the first distance is less than a predetermined distance, automatically initiating pairing with the peripheral;
in response to automatically initiating pairing, reducing peripheral and information handling system radio power from a nominal power to a pairing range of substantially the first distance;
in response to automatically initiating pairing, presenting at the information handling system instructions to move the peripheral from the first distance to a second distance; and
pausing the pairing until the phase-based radio ranging detects the second distance.

17. The method of claim 16 further comprising:
detecting the second distance;
in response to the detecting the second distance, completing the pairing without any end user inputs at the peripheral or information handling system; and
presenting at the information handling system a completion notification.

18. The method of claim 17 further comprising returning the information handling system and peripheral to the nominal power in response to the completing pairing.

* * * * *